March 3, 1970 R. D. GERARD ET AL 3,498,077
ATMOSPHERIC WATER RECOVERY METHOD AND MEANS
Filed Feb. 26, 1968
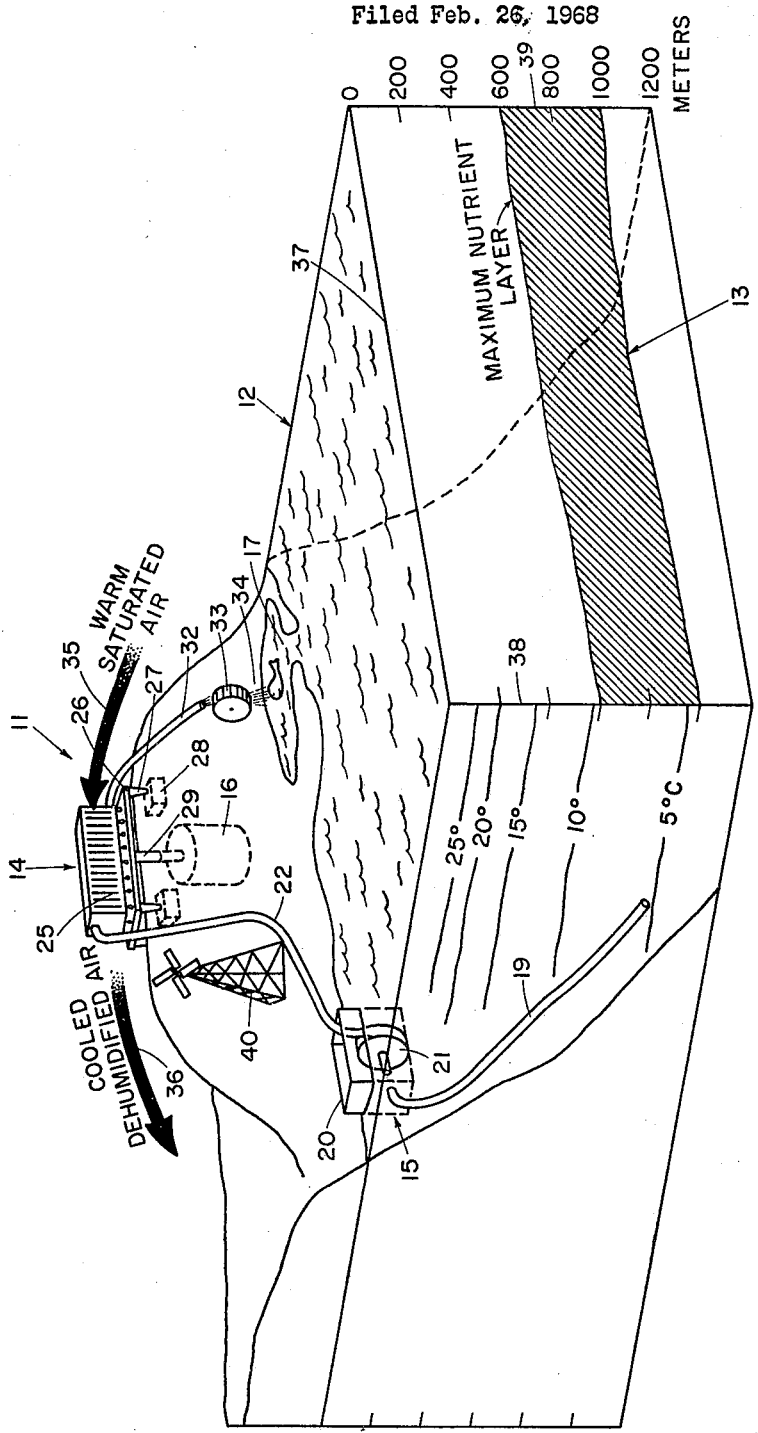
INVENTORS
Robert D. Gerard
J. Lamar Worzel United States Patent Office 3,498,077
Patented Mar. 3, 1970

3,498,077
ATMOSPHERIC WATER RECOVERY
METHOD AND MEANS
Robert Daniel Gerard and John L. Worzel, Palisades, N.Y., assignors, by mesne assignments, to the United States of America as represented by the Secretary of the Navy
Filed Feb. 26, 1968, Ser. No. 708,342
Int. Cl. F25d 23/12
U.S. Cl. 62—260                                   5 Claims

ABSTRACT OF THE DISCLOSURE

A method and means are provided whereby potable water may be obtained economically by condensing moisture from the atmosphere in suitable seashore or island areas. Deep, cold, offshore seawater is used as a source of cold and pumped to condensers set up on shore to intercept the flow of high humidity maritime air masses. This air, when cooled, condenses moisture which is conducted away and stored for use as a water supply. Windmill-driven generators may be employed to supply low-cost power for the operation. Side benefits are derived by using the large concentration of nutrients in deep water to support aquiculture in nearby lagoons or to enhance the productivity of the outfall area.

---

The invention described herein may be manufactured and used by or for the Government of the United States of America for governmental purposes without the payment of any royalties thereon or therefor.

The present invention relates to a device for recovering fresh water from the atmosphere and more particularly to such a device for condensing the moisture in maritime air masses over selected seashore or island areas.

There has long been a need for a substantially constant, economical source of fresh water for countries in island and coastal regions which lack an adequate supply and especially for such countries in the tropical zones. Various desalination systems are available to these countries but such systems have tremendous disadvantages a few of which are elaborate and costly equipment, high power operating requirements, severe corrosion due to handling strong brine solutions and contamination of the surrounding sea by the brine discharge, endangering the ecology and adding to the ultimate cost of the operation. Many of these countries, however, have enormous potential fresh water resources available in the form of atmospheric moisture in high humidity, maritime air masses. Unfortunately, these countries lack the means for recovering this moisture through present devices.

Existing available devices for recovering moisture from maritime air masses are costly and of questionable value since, among other deficiencies, they lack an adequate heat exchange means for removing heat from the coolant required in their operation. The present invention should provide relief for those countries in regions where it is applicable since it replaces conventional heat exchangers with deep, offshore seawater.

The present invention achieves economical moisture recovery by disposing in the normal path of movement of humid, maritime air masses condensing coils which are cooled by ocean water. The seawater that serves as the coolant is brought up from depths where low temperature and high phosphate and nitrate content conditions exist. This offshore water, after cooling the air masses, is discharged into the nearby sea, preferably a lagoon where the nutrients can give support to aquiculture. The components required are minimal and include a relatively large-diameter intake line of a length necessary to reach ocean depths where water temperatures of 10° to 20° C. below surface air temperature can be found. Ideally, this length would be on the order of one or two miles. Such an intake line or conduit would have a diameter sufficient to supply cooling water under a pressure head of about 15 feet at a rate in one embodiment of substantially 2000 cubic feet per minute. The water carried through the intake line is directed to a receiving tank having an inlet which is disposed a selected distance below sea level and is connected to a pump disposed near the level of the inlet. The remaining components are a condenser means including a set of condensing coils disposed at a selected elevation above sea level, a condensation collecting means and a reservoir.

Accordingly, it is an object of the present invention to provide a novel economical method of and means for condensing moisture from the atmosphere.

Another object of this invention is to provide a method of obtaining potable water in regions in the path of humid tropical air masses wherein deep, offshore seawater serves as the coolant.

A further object of this invention is to provide a method of and means for deriving potable water from humid tropical air masses wherein the fluid discharge is seawater having a high nutrient content in contrast to the harmful brine discharge of evaporation and desalination plants.

Other objects, advantages and novel features of the invention will become apparent from the following detailed description thereof when considered in conjunction with the accompanying drawing.

Referring to the drawing, there is shown the present condensing system 11 displayed for clarity in a cubic section of ocean water and adjacent land 12. The system derives cooling water from offshore in a layer 13 where temperatures of 10 to 20° C. below sea level air temperature exist. Cooling water from layer 13 is conducted to a condensing means 14 via a coolant supply means 15. Condensation from the condensing means 14 is collected in a fresh water reservoir means 16, while discharged coolant is deposited in an adjacent lagoon 17.

The coolant supply means 15 includes a deep water intake pipe 19 which preferably is made of plastic material and may be insulated along a selected portion of its length, a receiving tank 20, a pump 21 and a connecting pipe 22 connecting the pump and the condensing means 14. Tank 20 is partially immersed in the seawater adjacent the shoreline so that intake line 19 enters tank 20 a selected distance, preferably on the order of 15 feet, below the mean low water level of the seawater.

Condensing means 14 may include either a single or a series of condensing coils 25, a condensation collecting means 26 and support means for the collecting means and condensing coils such as legs 27 and foundation blocks 28. A connecting pipe 29 collects and discharges condensed moisture from collecting means 26 into the reservoir means 16. After traversing condensing coils 25, the seawater coolant is exited through a discharge line 32 onto a turbine drive means such as a waterwheel 33 whereby a portion of the power necessary to operate pumpe 21 is recovered. The discharge from waterwheel 33 is indicated at 34 and is preferably deposited in a lagoon or other sheltered area 17 wherein sea life may be supported by the added nutrient content of the water derived from the deep, offshore layer 13. Approaching moisture laden air masses are indicated by arrow 35, while the air leaving condensing means 14 is indicated by arrow 36.

The section 12 of ocean and land cut away to illustrate the invention is provided with scales, scale 38 indicating the temperature at various depths and scale 39 indicating depth. If desired, power may be derived from the prevailing maritime air masses by the use of one or more windmills as indicated at 40. Baffles or deflectors, not shown positioned to windward of condensing means 14 may be added in order to direct the air flow normal to the condensing means. Such baffles could also serve to intercept salt particles or spray which would decrease the purity of the condensed water.

In many coastal and island areas deep, offshore water having the desired temperature of 10 to 20° C. below sea level air temperature exists at depth as little as 300 meters and generally may be found between 300 and 1000 meters. In some areas, however, water of this temperature may be no more than a few miles to seaward of the shoreline. Often the presence of a submarine canyon may bring cold, deep water suitably close to shore across an otherwise shallow shelf. Deep water intake line 19 connecting to the cold, deep offshore water of layer 13 terminates near the base of tank 20, which tank is sunk below sea level at the shore. The depth of the tank 20 is such the the difference in level inside and outside the tank creates a sufficient head to force water up the intake line from the seaward end. The size of intake line 19 and the pumping rate of pump 21 are selected so that water will arrive at tank 20 at a temperature substantially the same as that at the seaward end of the intake line. If desired, the intake line may be insulated in the upper portions where it traverses warmer near-surface water. The cool seawater is pumped through condensing means 14 which is set in the path of the prevailing wind at a relatively high elevation. Atmospheric moisture condensing upon the condensing means surfaces is conduced away by collecting means 26 and pipe 29 to reservoir storage means 16 to be used as potable or irrigation water. The surfaces of condensing means 14 may be coated with a material, not shown, such as a noble metal to induce dropwise condensation; thereby avoiding the insulating characteristics of a water film. The water is removed from contact with the atmosphere as quickly as possible to avoid re-evaporation.

It has been determined that a system such as that outlined above may provide on the order of 16 grams of water per cubic meter of air moving past condensing coils 25. To achieve this, air with a relative humidity from 70 to 80 percent is estimated necessary with such air cooled from its normal temperature of within a few degrees of 25° C. to 10° C. and 100 percent humidity. Approximately 25 to 30 units of seawater should be pumped through the condenser for each unit of fresh water condensed. Such pumping represents the principal power requirement of the system. The source of power to deliver the seawater coolant would depend upon the economics peculiar to a locality. However, since installations are contemplated in areas having strong, constant, prevailing winds, such as the trade winds regions, power from windmills such as 40, the generator driven by waterwheel 33 or wind-driven electric generators would reduce significantly the power required from other sources.

An intake line substantially 3 feet in diameter would deliver 30 million gallons of seawater per day and produce substantially 1 million gallons of fresh water per day. An effective head from pump 21 to condensing means 14 of substantially 60 feet would require a workload of about 300 horsepower. Some of this power can be accounted for by a siphoning action, i.e. by returning the salt water to the sea surface in a closed system. Since the seawater pump 21 represents the principal power consumption in the entire system, the total power requirement for the system is exceedingly small.

Principal advantages of the present invention over other systems for production of fresh water therefore are its low operating cost and simplicity resulting from the utilization of the natural features of the environment together with a minimum of simple engineering devices. An example of use would be in the Caribbean where power obtained from windmills has in the past been used extensively for industrial and agricultural purposes. On St. Croix, for example, wind speeds average from 11 to 16 knots from northeast to southeast for all months except September and October, when the average wind is 7 to 10 knots. Calms average about 2 percent of all recorded wind readings. On the less developed and more remote islands, modern windmill electric generators would be an economical power source.

Included among the additional benefits accruing from the present system is the provision of seawater from the maximum nutrient layer which has been determined to exist at a depth from substantially 600 to 1000 meters. The nutrient salt concentration content of dissolved phosphate and nitrate in this layer is essentially in biological productivity in the ocean and is 10 to 20 times more plentiful there than at the surface. The 30 million gallons per day input of this high nutrient seawater, containing 7200 grams of phosphorous, preferably is delivered to a small lagoon where high productivity aquiculture experiments could be conducted. It has been calculated that a lagoon one mile in diameter could produce about one ton per week of food fish, or 10 times the amount of plankton protein at the second trophic level.

A further benefit of the present invention is the possible use of the cooled, dehumidified air to cool an inhabited area downwind of the condensing means. Air with lowered humidity and temperature would be available on the leeward side of the condensing means to add to the comfort of persons suitably located in this area. In addition, the invention may be adapted for installation and use on board ship whereby it could be moved to coastal areas where emergency water shortages exist. In such an embodiment, a large tanker could serve as a combined platform, storage vessel and pumping station. On a small scale, this invention could be utilized aboard lifeboats and rescue craft by employing a suitable length of hose to bring up cool subsurface water and a wind-wheel pump to supply water to a small condenser for recovery of condensed atmospheric moisture for the lifeboat occupants.

Obviously many modifications and variations of the present invention are possible in the light of the above teachings.

What is claimed is:

1. Apparatus for recovering atmospheric moisture from humid maritime air masses comprising:
   means conducting deep offshore water having a temperature substantially less than that of the surface water to a position near the water surface adjacent the shore line;
   means collecting said offshore water at said position adjacent the shore line,
      said collecting means exposed to ambient air pressure and disposed in the water at the surface thereof, the outlet of said conducting means positioned a substantial distance above the bottom of the collecting means;
   means at a shore elevation connected to and cooled by water from said collecting means for condensing moisture in the ambient air masses;
      said condensing means including pumping means for delivering offshore water from said collecting means to said condensing means at a selected rate of flow; and
   means for collecting and storing the condensed moisture; whereby a supply of potable water may be obtained at a minimum of cost and with a minimum of equipment.

2. The apparatus of claim 1 wherein said pumping means is positioned in the water collected in said collecting means to reduce to a minimum the heat added to the cooling system of said apparatus.

3. The apparatus of claim 2 wherein said moisture condensing means is a condenser having condensing coils disposed in the path of said humid maritime air masses;

said means for collecting and storing condensed moisture including a reservoir disposed beneath the surface of the ground to maintain the condensed water at a lower than ambient temperature.

4. The apparatus of claim 3 and further including power generating means having motive means disposed in the path of the coolant substantially adjacent the outlet of said discharge means;

the power derived from said power generating means supplying a portion of the power required of said source of power.

5. The apparatus of claim 4 wherein the offshore water collected is drawn from the layer of maximum nutrients which in some ocean areas occurs between the depths of substantially 600 and 1000 meters;

the cooling water discharged from said apparatus being directed into a protected area such as a lagoon to support sea life near the surface of the water.

References Cited

UNITED STATES PATENTS

| 2,761,292 | 9/1956 | Coanda | 62—260 |
| 2,805,560 | 9/1957 | Beresford | 62—260 |
| 2,996,897 | 8/1961 | Grimes | 62—260 |

FOREIGN PATENTS 272,668  3/1930  Italy.

WILLIAM J. WYE, Primary Examiner

U.S. Cl. X.R.

62—285, 291